US011227220B2

(12) United States Patent
Manoharan et al.

(10) Patent No.: US 11,227,220 B2
(45) Date of Patent: Jan. 18, 2022

(54) AUTOMATIC DISCOVERY OF DATA REQUIRED BY A RULE ENGINE

(71) Applicant: PAYPAL, INC., San Jose, CA (US)

(72) Inventors: Srinivasan Manoharan, San Jose, CA (US); Sahil Dahiya, San Jose, CA (US); Vinesh Chirakkil, San Jose, CA (US); Gurinder Grewal, San Jose, CA (US); Harish Nalagandla, San Jose, CA (US); Christopher S. Purdum, Sunnyvale, CA (US); Girish Sharma, San Jose, CA (US)

(73) Assignee: PayPal, Inc., San Jose, CA (US)

( * ) Notice: Subject to any disclaimer, the term of this patent is extended or adjusted under 35 U.S.C. 154(b) by 1069 days.

(21) Appl. No.: 15/844,464

(22) Filed: Dec. 15, 2017

(65) Prior Publication Data
US 2019/0188578 A1    Jun. 20, 2019

(51) Int. Cl.
*G06Q 40/00*    (2012.01)
*G06N 5/02*    (2006.01)
*G06Q 20/40*    (2012.01)

(52) U.S. Cl.
CPC .......... *G06N 5/025* (2013.01); *G06Q 20/405* (2013.01); *G06Q 20/4016* (2013.01)

(58) Field of Classification Search
CPC ... G06N 5/025; G06Q 20/4016; G06Q 20/405
See application file for complete search history.

(56) References Cited

U.S. PATENT DOCUMENTS 6,976,147 B1 * 12/2005 Isaac ................... G06F 12/0862
                                                    711/137
9,697,524 B1    7/2017 Fischer et al.
(Continued)

FOREIGN PATENT DOCUMENTS

EP          3101603 A1 * 12/2016   .......... G06Q 20/027
WO   WO-2009039419 A1 *  3/2009   .......... G07F 7/0886
(Continued)

OTHER PUBLICATIONS

Ebbers et al., "Fidelity National Information Systems Payments Reference Architecture for IBM System z," ibm.com/redbooks, SG24-7507-00 2008 (Year: 2008).*
(Continued)

*Primary Examiner* — Alexander G Kalinowski
*Assistant Examiner* — William B. Bunker
(74) *Attorney, Agent, or Firm* — Haynes and Boone, LLP

(57) ABSTRACT

Methods and systems for automatically discovering data types required by a computer-based rule engine for evaluating a transaction request are presented. Multiple potential paths for evaluating the transaction request according to the rule engine are determined. An abstract syntax tree may be generated based on the rule engine to determine the multiple potential paths. Based on an initial set of data extracted from the transaction request, one or more potential paths that are determined to be irrelevant to evaluating the transaction request are identified. Types of data required to evaluate the transaction request according to the remaining potential paths are determined. Only data that corresponds to the determined types of data is retrieved to evaluate the transaction request.

20 Claims, 6 Drawing Sheets

(56) References Cited

U.S. PATENT DOCUMENTS

| | | | |
|---|---|---|---|
| 10,679,160 B1* | 6/2020 | Mcfeeters | G06Q 10/063114 |
| 2003/0208684 A1* | 11/2003 | Camacho | G06Q 20/401 |
| | | | 713/186 |
| 2004/0068501 A1 | 4/2004 | McGoveran | |
| 2006/0282660 A1* | 12/2006 | Varghese | G06Q 20/4016 |
| | | | 713/155 |
| 2007/0079136 A1* | 4/2007 | Vishik | H04L 9/321 |
| | | | 713/186 |
| 2007/0239797 A1 | 10/2007 | Cattel et al. | |
| 2012/0317008 A1* | 12/2012 | Subramanian | G06Q 40/00 |
| | | | 705/35 |
| 2012/0317013 A1* | 12/2012 | Luk | G06Q 20/4016 |
| | | | 705/38 |
| 2013/0218765 A1* | 8/2013 | Hammad | G06Q 20/384 |
| | | | 705/41 |
| 2013/0262279 A1* | 10/2013 | Finley | G06Q 40/10 |
| | | | 705/31 |
| 2015/0046340 A1* | 2/2015 | Dimmick | H04L 63/104 |
| | | | 705/72 |
| 2015/0170148 A1* | 6/2015 | Priebatsch | G06Q 20/4016 |
| | | | 705/44 |
| 2016/0063502 A1* | 3/2016 | Adjaoute | G06N 20/00 |
| | | | 705/44 |
| 2016/0140537 A1* | 5/2016 | Salcedo | G06Q 30/04 |
| | | | 705/44 |
| 2016/0358130 A1* | 12/2016 | Capurro | G06Q 10/06316 |
| 2016/0371699 A1* | 12/2016 | Proctor | G06Q 20/3226 |
| 2017/0148021 A1* | 5/2017 | Goldstein | H04L 63/0281 |
| 2018/0026984 A1* | 1/2018 | Maker | H04L 63/102 |
| | | | 726/4 |
| 2018/0218041 A1* | 8/2018 | Arthanarisamy | |
| | | | G06F 16/24542 |
| 2019/0019169 A1* | 1/2019 | McLaughlin | G06Q 20/3224 |
| 2019/0102411 A1* | 4/2019 | Hung | H04L 41/0856 |
| 2019/0164176 A1* | 5/2019 | Pydynowski | H04L 67/22 |
| 2020/0258087 A9* | 8/2020 | Knoblauch | G06Q 20/4016 |

FOREIGN PATENT DOCUMENTS

| | | | | |
|---|---|---|---|---|
| WO | WO-2013082190 A1 * | 6/2013 | | G06F 21/577 |
| WO | WO-2018059656 A1 * | 4/2018 | | G06F 12/0811 |

OTHER PUBLICATIONS

Kooijmans et al., "Transaction Processing: Past, Present, and Future," ibm.com/redbooks, SG24-7507-00 2012 (Year: 2012).*

* cited by examiner

| | Trans. Type | Mobile | Am. >500 | Data Types |
|---|---|---|---|---|
| Path 1 | Login | Yes | N/A | Type Set 1 |
| Path 2 | Login | No | N/A | Type Set 2 |
| Path 3 | Pay | Yes | Yes | Type Set 3 |
| Path 4 | Pay | Yes | No | Type Set 4 |
| Path 5 | Pay | No | Yes | Type Set 5 |
| Path 6 | Pay | No | No | Type Set 6 |
| Path 7 | Add Card | Yes | N/A | Type Set 7 |
| Path 8 | Add Card | No | N/A | Type Set 8 |

Figure 5

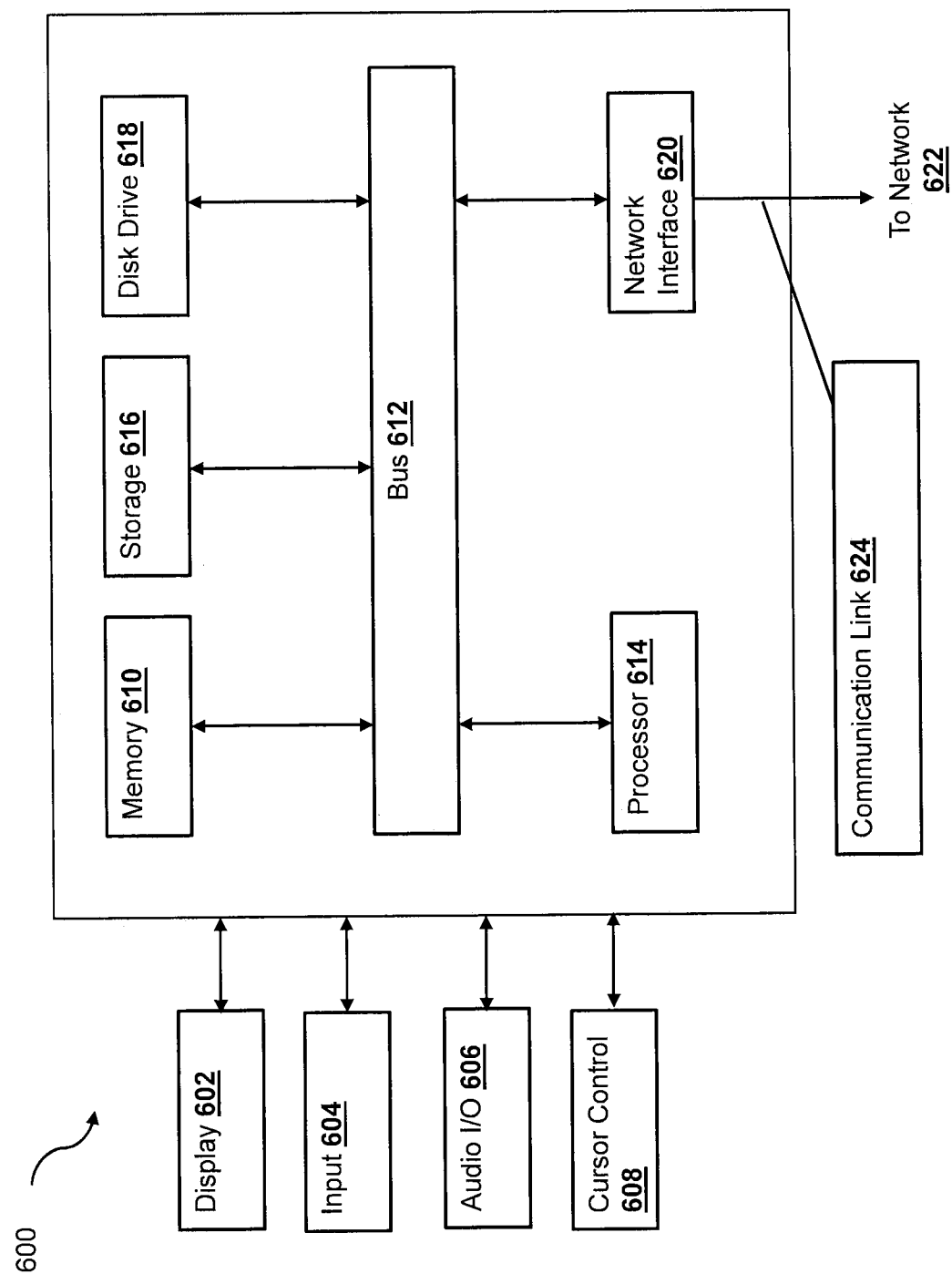

AUTOMATIC DISCOVERY OF DATA REQUIRED BY A RULE ENGINE

BACKGROUND

The present specification generally relates to processing electronic transaction requests, and more specifically to, improving the performance of a rule engine in processing electronic transaction requests.

RELATED ART

Today, an entity such as a bank or a retail store that provides online services to users may receive millions of online transaction requests each day. In addition to providing adequate services to the users, the entities also need to prevent unauthorized access to user accounts. For example, malicious users are known to use various tactics such as phishing, man-in-the-middle-attacks, to obtain credentials associated with user accounts, and perform unauthorized transactions using those user accounts. In these instances, the entities need to differentiate unauthorized requests from authorized ones such that the user accounts are protected from unauthorized access and use. For example, the entities may deny requests that are determined to be possibly unauthorized. Furthermore, by denying the unauthorized requests, more processing power may be spent on processing the authorized requests, thus improving the service performance and quality for the legitimate users, while reducing the amount of computational power needed for processing and then remedying unauthorized requests.

Conventionally, rule engines may be used to determine, in real-time, whether a received transaction request is possibly an unauthorized or fraudulent transaction request. However, as a rule engine becomes more complicated having to take into account a large number of different scenarios, they become inefficient. For example, some rule engines may require a large amount of data related to the transaction request in order to make such a determination. While some of the data may be obtained directly from the transaction request or from an internal source, other data may require retrieval from an external source, which causes delay in the authorization determination process and affects service performances to end users. Thus, there is a need for improving the performances of rule engines.

BRIEF DESCRIPTION OF THE FIGURES

FIG. 5 illustrates an exemplary data structure for storing information associated with potential paths for evaluating a transaction request according to an embodiment of the present disclosure; and FIG. 6 is a block diagram of a system for implementing a device according to an embodiment of the present disclosure.

Figure 1:
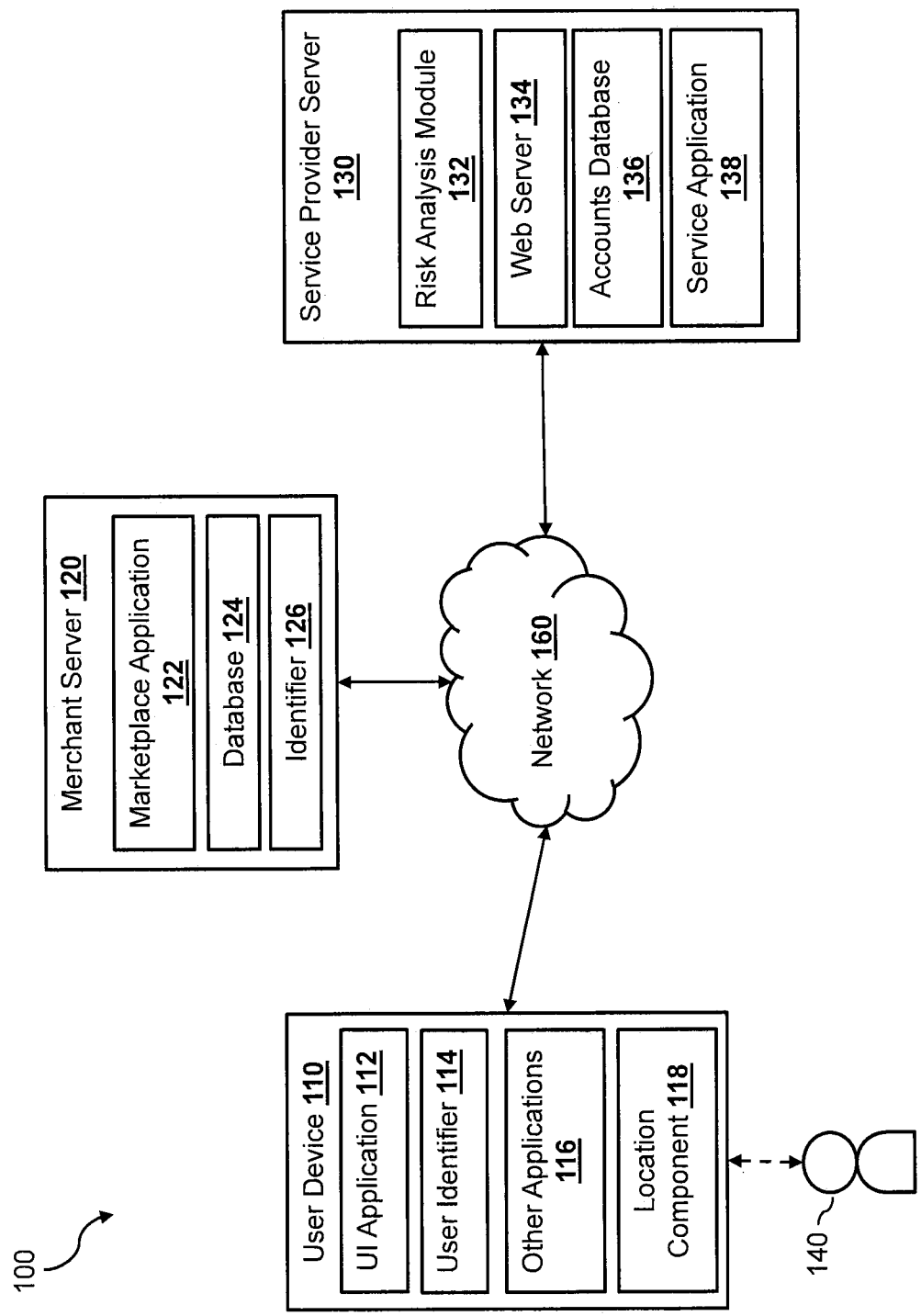
FIG. 1 is a block diagram illustrating an electronic transaction system according to an embodiment of the present disclosure.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

The present disclosure describes methods and systems for providing a mechanism that automatically discovers types of data required by a computer-based rule engine for evaluating a transaction request based on information extracted from the transaction request. The rule engine is communicatively coupled with a computer server, such as a web server, that receives transaction requests from users. Each request is for a particular service provided by an entity in association with a user account with the entity. Example transaction requests may include a log-in request for logging into a user account with the entity, a payment request for making a payment from a user account with the entity, and a request to add an additional funding source to a user account with the entity.

A rule engine comprises numerous conditions, and is configured to provide an outcome for the transaction request by analyzing the transaction request according to the conditions. In some embodiments, the outcome provided by the rule engine may be a binary outcome—an indication of whether the transaction request is a legitimate request or a fraudulent request. In other embodiments, the outcome provided by the rule engine may be a score that indicates a likelihood that the transaction request is a fraudulent request. The outcome may then be provided to the computer server such that the computer server may process (e.g., approve or deny) the online transaction request accordingly. Thus, it is often required that the rule engine evaluates the online transaction requests in real-time (e.g., within a second from receiving such an online transaction request) such that the computer server may timely process the online transaction requests.

In some embodiments, in order to evaluate the numerous conditions for generating the outcome, the rule engine requires a variety of information related to the online transaction request and/or information related to a user account associated with the online transaction request. The information may include one or more of an Internet Protocol (IP) address of a source of the transaction request, a number of successful transactions within a predetermined period of time, a number of failed transactions within the predetermined period of time, a time, a browser type, a device type, an amount associated with the transaction, or a transaction type of the transaction. Some of the information required by the rule engine to generate the outcome may be extracted directly from the transaction request (e.g., IP address of the source of the transaction request, a payment amount, etc.) while some other information required by the rule engine may be retrieved from a device used to initiate the request, from an internal source (other servers or databases related to the rule engine that store relevant information related to a user account), or even from an external source (e.g., a credit bureau, etc.). As such, some of the information may be obtained quicker than other information.

Furthermore, the type of information required by the rule engine in order for the rule engine to generate the outcome may vary from transaction request to transaction request, as some of the information required by the rule engine may depend on one or more factors, such as other information related to the transaction request or whether one or more conditions are satisfied. For example, the rule engine may include multiple paths for evaluating a transaction request, where each path may include one or more conditions. The rule engine may take different paths to evaluate different transaction requests, for example, due to the different transaction requests being associated with different transaction types. The rule engine may evaluate a login request using a first path and may evaluate a payment transaction request using a second path, where the information required to evaluate the request under the first path is different from the information required to evaluate the request under the second path.

Conventionally, a rule engine may, at the outset of evaluating a transaction request, retrieve all information required to evaluate every one of the conditions in the rule engine (e.g., the conditions from both the first and the second paths, assuming the rule engine only has two paths). The benefit of such an approach is that the information is readily available to the rule engine when it is needed to evaluate each condition along the evaluation process, and the time for the actual evaluation would be relatively short. However, since not all of the retrieved information may be necessary for the rule engine to generate the outcome, the time to retrieve the unneeded information may be wasted.

Under another approach, a rule engine may not retrieve information at the outset, but instead, retrieve information only when the information is absolutely needed during the process of evaluating the transaction request (e.g., when the rule engine needs the information to determine whether a condition is satisfied). This way, only information that is necessary for the rule engine to generate an outcome for the transaction request (only the information required to evaluate the transaction request under a particular path) is retrieved, which eliminates the time to retrieve unnecessary information. However, this approach delays the process of evaluating the transaction request, which is also undesirable.

It has been contemplated that the performance of the rule engine may be further improved under a third approach where the types of data that are not required by the rule engine to evaluate a transaction request may be identified at the outset based on information extracted directly from the transaction request. The types of data not identified (which may be potentially required by the rule engine) may then be retrieved prior to performing the evaluation of the transaction request. This way, all information that may be needed during the evaluation is readily available when the rule engine needs it, but the time to retrieve unnecessary information may be reduced.

In some embodiments, all potential paths that the rule engine may traverse in evaluating a transaction request are determined. Each path may include one or more conditions. Information from the transaction request may be extracted. Based on the information extracted from the transaction request, a subset of the potential paths may be determined to be irrelevant or unnecessary in evaluating the transaction request, and therefore eliminated from consideration. The types of data that are required under the remaining potential paths may be retrieved to evaluate the transaction request. The transaction request may then be evaluated using the rule engine through one of the remaining potential paths based on the retrieved data. In some embodiments, the rule engine may provide an outcome that indicates whether the transaction request is possibly an unauthorized/fraudulent request. The transaction request may then be processed (or denied) according to the generated outcome.

Different embodiments may use different techniques to determine the potential paths that are irrelevant to evaluating the transaction request. In some embodiments, an abstract syntax tree may be generated based on parsing the rules in the rule engine. The abstract syntax tree is a tree-based data structure that includes inter-connected nodes. Each node represents a set of conditions for evaluating the transaction request, and nodes that are serially connected together by edges form a path. By traversing the abstract syntax tree, such as using a depth first search method or a breadth first search method, the numerous potential paths for evaluating a transaction request according to the rule engine may be determined. Furthermore, conditions for determining which one or more potential paths that a transaction request may follow according to the rule engine may also be retrieved. By analyzing the data extracted from the transaction request based on the conditions, one or more potential paths may be determined to be irrelevant to evaluating the transaction request. For example, when the data extracted from the transaction request indicates that the transaction request is a login request and a first potential path in the abstract syntax tree is only for evaluating a payment transaction request, it can be determined that the first potential path is irrelevant to evaluating the transaction request.

After determining that one or more potential paths are not relevant to evaluating the transaction request, the types of data that are required for evaluating the transaction request in the remaining paths according to the rule engine may be determined. Data related to the determined types of data may then be retrieved for evaluating the transaction request.

In some embodiments, the abstract syntax tree and information of the different potential paths derived from the abstract syntax tree may be stored as metadata for the rule engine, to be used in any subsequent evaluations of transaction requests.

FIG. 1 illustrates an electronic transaction system 100 according to one embodiment of the disclosure. The electronic transaction system 100 includes a service provider server 130, a merchant server 120, and a user device 110 that may be communicatively coupled with each other via a network 160. The network 160, in one embodiment, may be implemented as a single network or a combination of multiple networks. For example, in various embodiments, the network 160 may include the Internet and/or one or more intranets, landline networks, wireless networks, and/or other appropriate types of communication networks. In another example, the network 160 may comprise a wireless telecommunications network (e.g., cellular phone network) adapted to communicate with other communication networks, such as the Internet.

The user device 110, in one embodiment, may be utilized by a user 140 to interact with the merchant server 120 and/or the service provider server 130 over the network 160. For example, the user 140 may use the user device 110 to log in to a user account to conduct account services or conduct financial transactions (e.g., account transfers or payments) with the service provider server 130. Similarly, a merchant associated with the merchant server 120 may use the merchant server 120 to log in to a merchant account to conduct account services or conduct financial transactions (e.g., payment transactions) with the service provider server 130. The user device 110, in various embodiments, may be implemented using any appropriate combination of hardware and/or software configured for wired and/or wireless communication over the network 160. In various implementations, the user device 110 may include at least one of a wireless cellular phone, wearable computing device, PC, laptop, etc.

The user device 110, in one embodiment, includes a user interface (UI) application 112 (e.g., a web browser), which may be utilized by the user 140 to conduct transactions (e.g., shopping, purchasing, bidding, etc.) with the service provider server 130 over the network 160. In one aspect, purchase expenses may be directly and/or automatically debited from an account related to the user 140 via the user interface application 112.

In one implementation, the user interface application 112 includes a software program, such as a graphical user interface (GUI), executable by a processor that is configured to interface and communicate with the service provider server 130 via the network 160. In another implementation, the user interface application 112 includes a browser module that provides a network interface to browse information available over the network 160. For example, the user interface application 112 may be implemented, in part, as a web browser to view information available over the network 160.

The user device 110, in various embodiments, may include other applications 116 as may be desired in one or more embodiments of the present disclosure to provide additional features available to the user 140. In one example, such other applications 116 may include security applications for implementing client-side security features, programmatic client applications for interfacing with appropriate application programming interfaces (APIs) over the network 160, and/or various other types of generally known programs and/or software applications. In still other examples, the other applications 116 may interface with the user interface application 112 for improved efficiency and convenience.

The user device 110, in one embodiment, may include at least one user identifier 114, which may be implemented, for example, as operating system registry entries, cookies associated with the user interface application 112, identifiers associated with hardware of the user device 110 (e.g., a media control access (MAC) address), or various other appropriate identifiers. The user identifier 118 may include one or more attributes related to the user 140 of the user device 110, such as personal information related to the user (e.g., one or more user names, passwords, photograph images, biometric IDs, addresses, phone numbers, social security number, etc.) and banking information and/or funding sources (e.g., one or more banking institutions, credit card issuers, user account numbers, security data and information, etc.). In various implementations, the user identifier 114 may be passed with a user login request to the service provider server 130 via the network 160, and the user identifier 114 may be used by the service provider server 130 to associate the user with a particular user account maintained by the service provider server 130.

In various implementations, the user 140 is able to input data and information into an input component (e.g., a keyboard) of the user device 110 to provide user information with a transaction request, such as a login request, a fund transfer request, a request for adding an additional funding source (e.g., a new credit card), or other types of request. The user information may include user identification information.

The user device 110, in various embodiments, includes a location component 118 configured to determine, track, monitor, and/or provide an instant geographical location of the user device 110. In one implementation, the geographical location may include GPS coordinates, zip-code information, area-code information, street address information, and/or various other generally known types of location information. In one example, the location information may be directly entered into the user device 110 by the user via a user input component, such as a keyboard, touch display, and/or voice recognition microphone. In another example, the location information may be automatically obtained and/or provided by the user device 110 via an internal or external monitoring component that utilizes a global positioning system (GPS), which uses satellite-based positioning, and/or assisted GPS (A-GPS), which uses cell tower information to improve reliability and accuracy of GPS-based positioning. In other embodiments, the location information may be automatically obtained without the use of GPS. In some instances, cell signals or wireless signals are used. For example, location information may be obtained by checking in using the user device 110 via a check-in device at a location, such as a beacon. This helps to save battery life and to allow for better indoor location where GPS typically does not work.

Even though only one user device 110 is shown in FIG. 1, it has been contemplated that one or more user devices (each similar to user device 110) may be communicatively coupled with the service provider server 130 via the network 160 within the system 100.

The merchant server 120, in various embodiments, may be maintained by a business entity (or in some cases, by a partner of a business entity that processes transactions on behalf of business entity). Examples of business entities include merchant sites, resource information sites, utility sites, real estate management sites, social networking sites, etc., which offer various items for purchase and process payments for the purchases. The merchant server 120 may include a merchant database 124 for identifying available items, which may be made available to the user device 110 for viewing and purchase by the user.

The merchant server 122, in one embodiment, may include a marketplace application 122, which may be configured to provide information over the network 160 to the user interface application 112 of the user device 110. For example, the user 140 of the user device 110 may interact with the marketplace application 122 through the user interface application 112 over the network 160 to search and view various items available for purchase in the merchant database 124.

The merchant server 120, in one embodiment, may include at least one merchant identifier 126, which may be included as part of the one or more items made available for purchase so that, e.g., particular items are associated with the particular merchants. In one implementation, the merchant identifier 126 may include one or more attributes and/or parameters related to the merchant, such as business and banking information. The merchant identifier 126 may include attributes related to the merchant server 120, such as identification information (e.g., a serial number, a location address, GPS coordinates, a network identification number, etc.).

A merchant may also use the merchant server 120 to communicate with the service provider server 130 over the network 160. For example, the merchant may use the merchant server 120 to communicate with the service provider server 130 in the course of various services offered by the service provider to a merchant, such as payment intermediary between customers of the merchant and the merchant itself. For example, the merchant server 120 may use an application programming interface (API) that allows it to offer sale of goods in which customers are allowed to make payment through the service provider server 130, while the user 140 may have an account with the service provider server 130 that allows the user 140 to use the service provider server 130 for making payments to merchants that allow use of authentication, authorization, and payment services of the service provider as a payment intermediary. The merchant may also have an account with the service provider server 130. Even though only one merchant server 120 is shown in FIG. 1, it has been contemplated that one or more merchant servers (each similar to merchant server 120) may be communicatively coupled with the service provider server 130 and the user device 110 via the network 160 in the system 100.

The service provider server 130, in one embodiment, may be maintained by a transaction processing entity or an online service provider, which may provide processing for electronic transactions between the user 140 of user device 110 and one or more merchants. As such, the service provider server 130 may include a service application 138, which may be adapted to interact with the user device 110 and/or the merchant server 120 over the network 160 to facilitate the searching, selection, purchase, payment of items, and/or other services offered by the service provider server 130. In one example, the service provider server 130 may be provided by PayPal®, Inc., eBay® of San Jose, Calif., USA, and/or one or more service entities or a respective intermediary that may provide multiple point of sale devices at various locations to facilitate transaction routings between merchants and, for example, service entities.

In some embodiments, the service application 138 may include a payment processing application (not shown) for processing purchases and/or payments for electronic transactions between a user and a merchant. In one implementation, the payment processing application assists with resolving electronic transactions through validation, delivery, and settlement. As such, the payment processing application settles indebtedness between a user and a merchant, wherein accounts may be directly and/or automatically debited and/or credited of monetary funds in a manner as accepted by the banking industry.

The service provider server 130 may also include a web server 134 that is configured to serve web content to users in response to HTTP requests. As such, the web server 134 may include pre-generated web content ready to be served to users. For example, the web server 134 may store a log-in page, and is configured to serve the log-in page to users for logging into user accounts of the users to access various service provided by the service provider server 130. The web server 134 may also include other webpages associated with the different services offered by the service provider server 130. As a result, a user may access a user account associated with the user and access various services offered by the service provider server 130, by generating HTTP requests directed at the service provider server 130.

In various embodiments, the service provider server includes a risk analysis module 132 that is configured to determine whether to authorize or deny an incoming request from the user device 110 or from the merchant server 120. The request may be a log-in request, a fund transfer request, a request for adding an additional funding source, or other types of requests associated with the variety of services offered by the service provider server 130. As such, when a new request is received at the service provider server 130 (e.g., by the web server 134), the risk analysis module 132 may analyze (or evaluate) the request and determine whether the request is possibly an unauthorized/fraudulent request based on information available to the risk analysis module. The risk analysis module 132 may transmit an indication of whether the request is possibly an unauthorized/fraudulent request to the web server 134 and/or the service application 138 such that the web server 134 and/or the service application 138 may process (e.g., approve or deny) the request based on the indication.

The service provider server 130, in one embodiment, may be configured to maintain one or more user accounts and merchant accounts in an account database 136, each of which may include account information associated with one or more individual users (e.g., the user 140 associated with user device 110) and merchants. For example, account information may include private financial information of users and merchants, such as one or more account numbers, passwords, credit card information, banking information, digital wallets used, or other types of financial information, transaction history, Internet Protocol (IP) addresses, device information associated with the user account, which may be used by the risk analysis module 132 to determine whether to authorize or deny a request associated with the user account. In certain embodiments, account information also includes user purchase profile information such as account funding options and payment options associated with the user, payment information, receipts, and other information collected in response to completed funding and/or payment transactions.

User purchase profile information may be compiled or determined in any suitable way. In some instances, some information is solicited when a user first registers with a service provider. The information might include demographic information, a survey of purchase interests, and/or a survey of past purchases. In other instances, information may be obtained from other databases. In certain instances, information about the user and products purchased are collected as the user shops and purchases various items.

In one implementation, a user may have identity attributes stored with the service provider server 130, and the user may have credentials to authenticate or verify identity with the service provider server 130. User attributes may include personal information, banking information and/or funding sources. In various aspects, the user attributes may be passed to the service provider server 130 as part of a login, search, selection, purchase, and/or payment request, and the user attributes may be utilized by the service provider server 130 to associate the user with one or more particular user accounts maintained by the service provider server 130.

Figure 2:
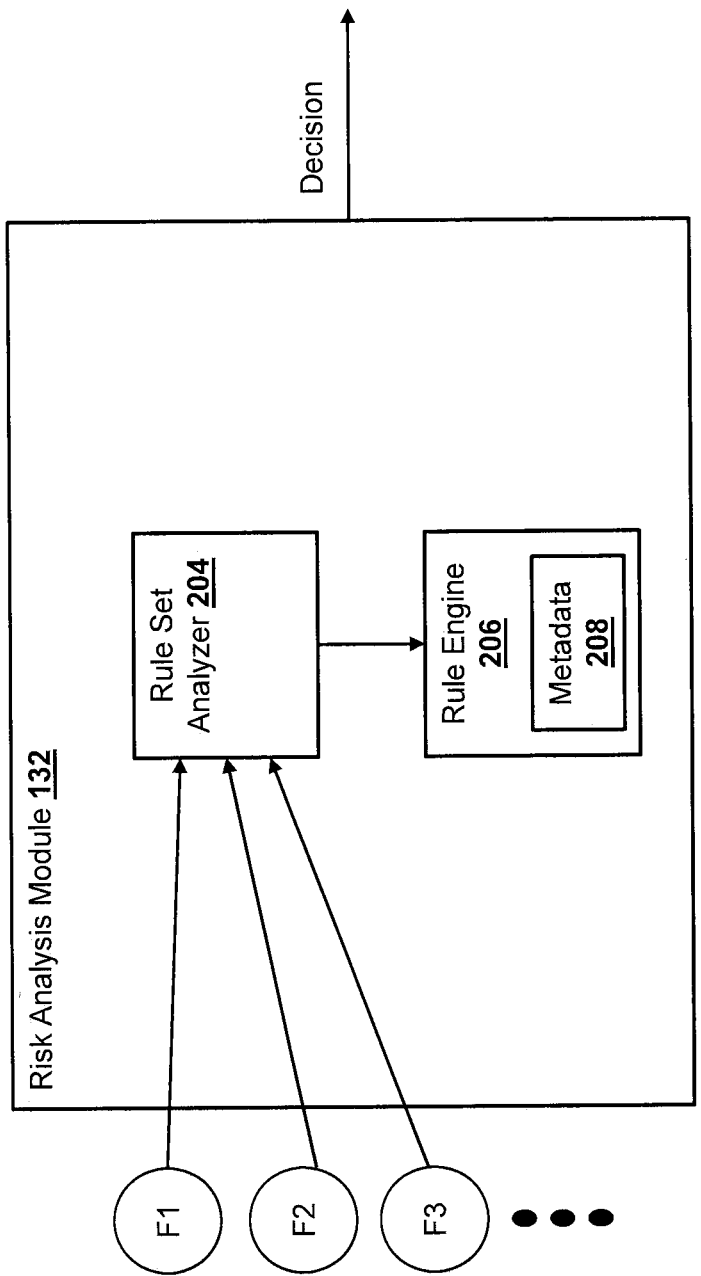
FIG. 2 is a block diagram illustrating a risk analysis module according to an embodiment of the present disclosure.

FIG. 2 illustrates a block diagram of the risk analysis module 132 according to an embodiment of the disclosure. The risk analysis module 132 includes a rule set analyzer 204 and a rule engine 206. The rule engine 206 is a computer-based rule engine and may include multiple different sets of rules (or conditions) for evaluating a transaction request. When a transaction request is received by the risk analysis module 132 (e.g., a user initiated request received via the web server 134), the rule engine 206 may use at least some of the different sets of conditions to evaluate the transaction request in order to generate an outcome. As discussed above, in some embodiments, based on whether some of the conditions are satisfied or not (using the data related to the transaction engine), the rule engine 206 may generate an outcome that indicates whether the request is possibly an unauthorized/fraudulent request. The outcome may be a binary outcome or a score that indicates a likelihood of whether the request is possibly an unauthorized/fraudulent request. The outcome may be transmitted to other modules of the service provider server 130, such as the web server 134 and/or the service application 138, such that these other modules may process (e.g., approve or deny) the transaction request accordingly.

Figure 3:
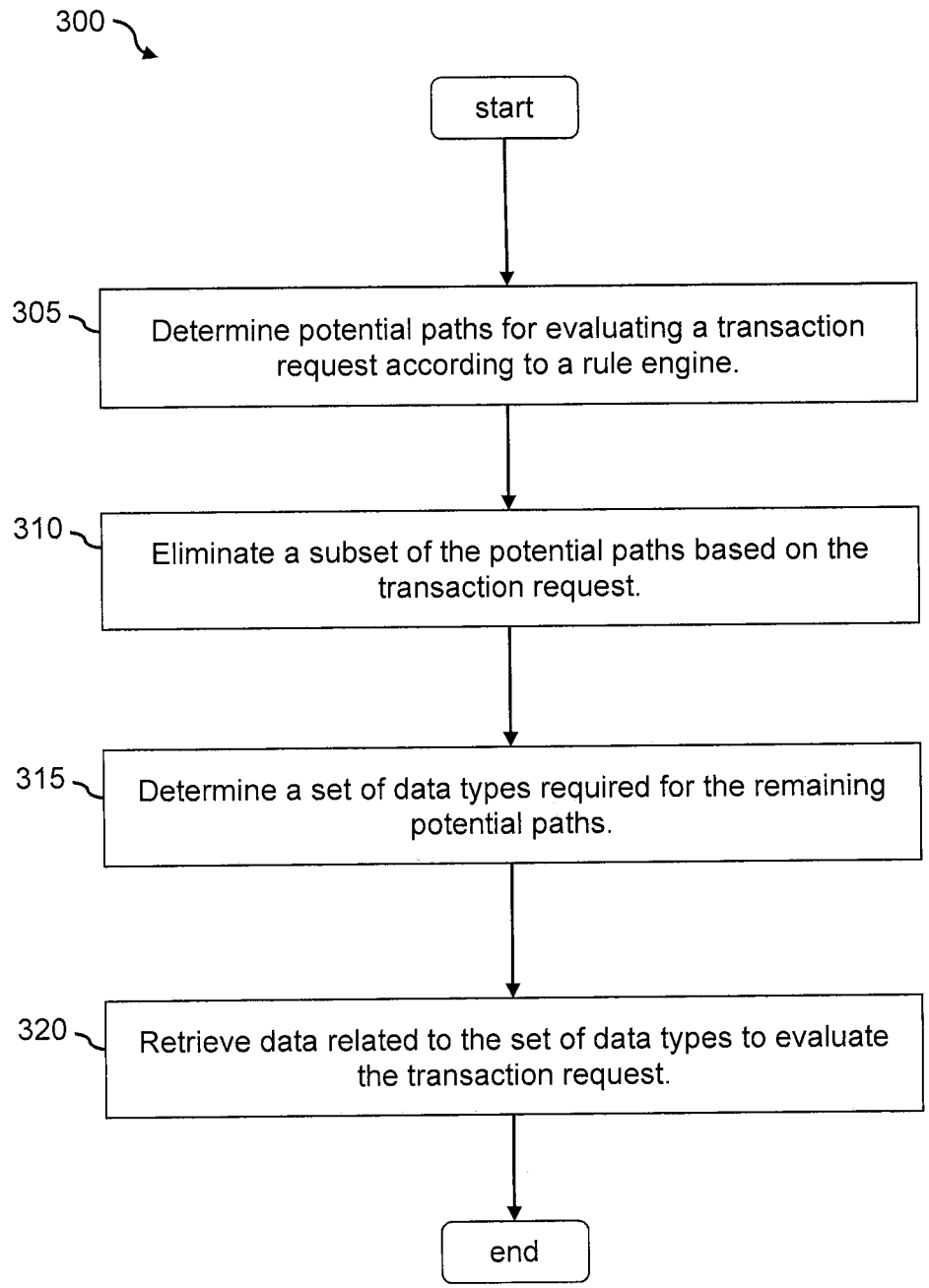
FIG. 3 is a flowchart showing a process of discovering data types required by a computer-based rule engine for evaluating a transaction request according to an embodiment of the present disclosure.

In some embodiments, prior to evaluating the transaction request by the rule engine 206, the rule set analyzer 204 may determine the types of data related to the transaction request that may be required by the rule engine 206 for evaluating the transaction request using the techniques described herein. FIG. 3 illustrates a process 300 for evaluating a transaction request according to an embodiment of the disclosure. In some embodiments, the process 300 may be performed by the risk analysis module 132 of the service provider server 130. The process 300 begins by determining (at step 305) potential paths for evaluating a transaction request according to a rule engine.

Different embodiments may use different techniques to determine the different potential paths for evaluating a transaction request according to the rule engine. For example, as discussed above, the rule set analyzer 204 of some embodiments may generate an abstract syntax tree for the rule engine 206 based on parsing the rules (or software instructions containing the rules) in the rule engine 206. The abstract syntax tree comprises nodes that are connected together, where each node includes a set of conditions. Nodes that are connected serially form a path for evaluating a transaction request. When a node is being traversed, the set of conditions associated with the node is assessed based on data related to the transaction request. Based on the data related to the transaction request, the rule engine 306 may determine whether the set of conditions is satisfied, and then move on to a subsequent (successor) node in a path. When the node is connected to more than one successor node, the rule engine 306 may determine which path (which subsequent node) to take based on whether the set of conditions is satisfied.

Figure 4:
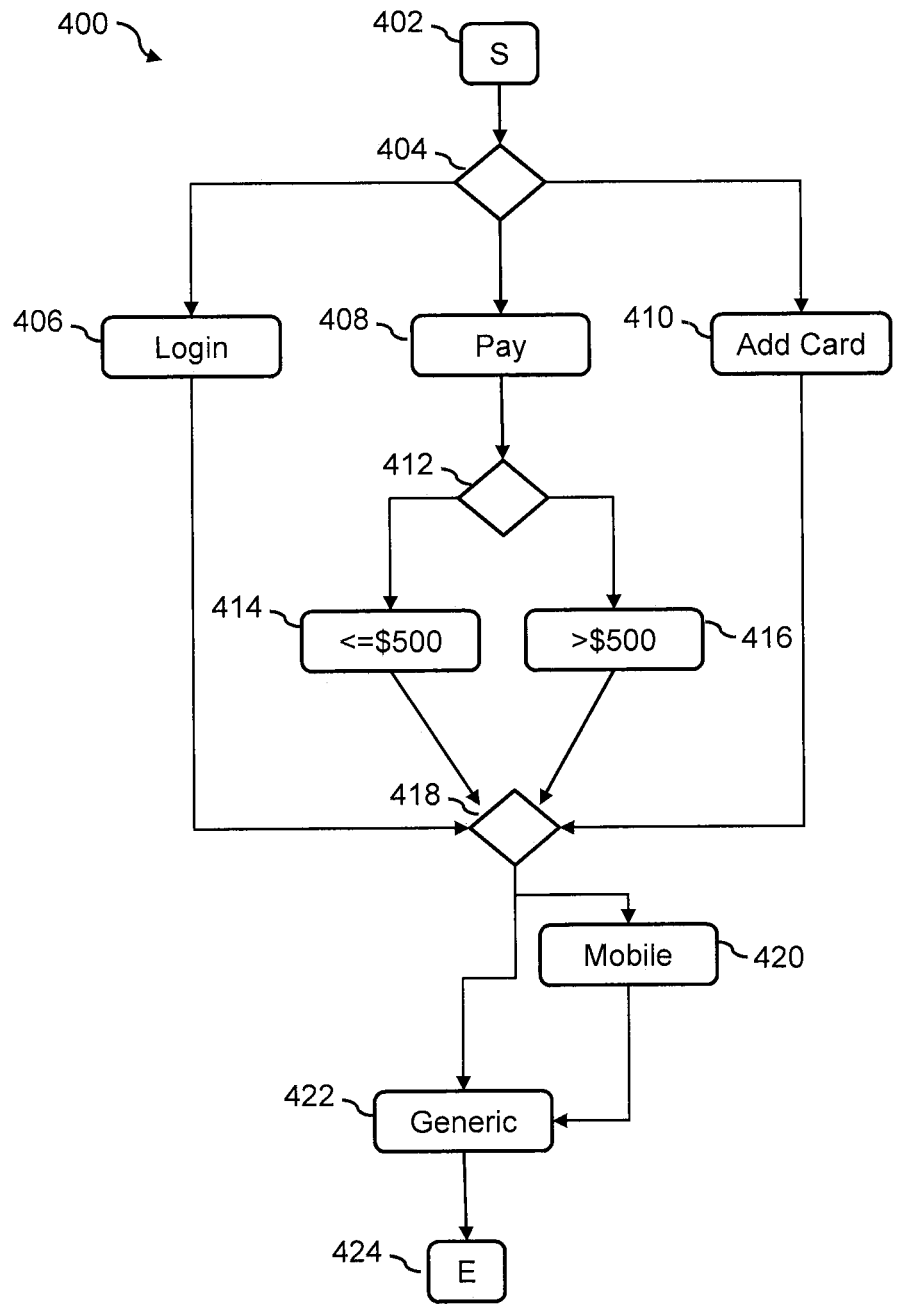
FIG. 4 illustrates an exemplary abstract syntax tree according to an embodiment of the present disclosure.

FIG. 4 illustrates an exemplary abstract syntax tree 400 according to an embodiment of the disclosure. The abstract syntax tree 400 may be generated by the rule set analyzer 204 by parsing the rule engine 206. As shown, the abstract syntax tree includes a start node 402 and an end node 424. When a transaction request is being evaluated, the rule engine 206 begins the evaluation at the start node 402. The start node 402 is connected to only one node 404, so the rule engine 206 may continue along the path to traverse the node 404. The node 404 is connected to three different successor nodes 406, 408, and 410. As such, the rule engine 206 may use information related to the transaction request to assess the set of conditions of the node 404. Based on the result from assessing the set of conditions of the node 404, the rule engine 206 may take a path that leads to the node 406, a path that leads to the node 408, or a path that leads to the node 410. In this example, the set of conditions may include a condition of whether the transaction request is a login request, a condition of whether the transaction request is a payment transaction request, and a condition of whether the transaction request is a request to add a funding source to a user account. When it is determined that the transaction request is a login request, the rule engine 206 may take the path that leads to the node 406.

After evaluating the process request under the node 406, the path leads to the node 418. Similar to the node 404, the node 418 is connected to more than one successor node. In this example, the node 418 is connected to two nodes: a node 420 and a node 422. As such, the rule engine 206 may use information related to the transaction request to assess the set of conditions of the node 418. Based on the result from assessing the set of conditions of the node 418, the rule engine 206 may take a path that leads to the node 420 or a path that leads to the node 422. In this example, the set of conditions may include a condition of whether the transaction request is initiated from a mobile device or not. When it is determined that the transaction request is not initiated from a mobile device, the rule engine 206 may take the path that leads to the node 422, and then reaching the end node 424. At the end node, the rule engine 206 may generate an outcome based on evaluation performed along the path that traverses the nodes 402, 404, 406, 418, 422, and 424.

On the other hand, if it is determined that the transaction request is generated from a mobile device, the rule engine 206 may take the path that leads to the node 420, which then reverts back to the node 422. The path then leads to the end node 424, at which point the rule engine 206 may generate an outcome based on the evaluation performed along the path that traverses the nodes 402, 404, 406, 418, 420, 422, and 424.

Referring back to the node 404, when it is determined that the transaction request is a payment transaction request, the rule engine 206 may take the path that leads to the node 408. After the node 408, the path then reaches the node 412, which connects to two different nodes—414 and 416. As such, the rule engine 206 may use information related to the transaction request to assess the set of conditions of the node 412. Based on the result from assessing the set of conditions of the node 412, the rule engine 206 may take a path that leads to the node 414 or a path that leads to the node 416. In this example, the set of conditions may include a condition of whether the payment transaction request involves an amount that is larger than $500 or not. When it is determined that the payment transaction request involves an amount larger than $500, the rule engine 206 may take the path that leads to the node 416, which leads to the node 418. The rule engine 206 then performs similar process as described above before reaching the end node 424, at which point, the rule engine may generate an outcome based on evaluation performed either along the path that traverses the nodes 402, 404, 408, 412, 416, 418, 422, and 424 or the path that traverses the nodes 402, 404, 408, 412, 416, 418, 420, 422, and 424.

On the other hand, if it is determined that the payment transaction request involves an amount that is less than or equal to $500, the rule engine 206 may take the path that leads to the node 414, which leads to the node 418. The rule engine 206 then performs similar process as described above before reaching the end node 424, at which point, the rule engine may generate an outcome based on evaluation performed either along the path that traverses the nodes 402, 404, 408, 412, 414, 418, 422, and 424 or the path that traverses the nodes 402, 404, 408, 412, 414, 418, 420, 422, and 424.

Referring back to the node 404, when it is determined that the transaction request is a request for adding an additional funding source, the rule engine 206 may take the path that leads to the node 410, which leads to the node 418. The rule engine 206 then performs a similar process as described above before reaching the end node 424, at which point, the rule engine may generate an outcome based on evaluation performed either along the path that traverses the nodes 402, 404, 410, 418, 422, and 424 or the path that traverses the nodes 402, 404, 410, 418, 420, 422, and 424.

By traversing the entire abstract syntax tree 400, the rule set analyzer 204 may determine that there are eight potential paths in total for evaluating a transaction request according to the rule engine 206. The rule set analyzer 204 may then retrieve information related to each potential path and store the information in a data structure. The information related to each path may include the conditions in which a transaction request must satisfy in order to traverse such a path.

FIG. 5 illustrates an example data structure 500 for storing information related to the potential paths from the abstract syntax tree 400. In this example, the data structure 500 is shown to be in a table format. However, it has been contemplated that the rule set analyzer 204 may use other types of data structure (e.g., an XML file, a database, a text file, etc.). As shown, the data structure 500 includes eight rows 502-516, where each row represents a distinct potential path according to the rule engine 206. For example, the row 502 represents 'Path 1' that traverses the nodes 402, 404, 406, 418, 420, 422, and 424, the row 504 represents 'Path 2' that traverses the nodes 402, 404, 410, 418, 422, and 424, the row 506 represents 'Path 3' that traverses the nodes 402, 404, 408, 412, 416, 418, 420, 422, and 424, the row 508 represents 'Path 4' that traverses the nodes 402, 404, 408, 412, 414, 418, 420, 422, and 424, the row 510 represents 'Path 5' that traverses the nodes 402, 404, 408, 412, 416, 418, 422, and 424, the row 512 represents 'Path 6' that traverses the nodes 402, 404, 408, 412, 414, 418, 422, and 424, the row 514 represents 'Path 7' that traverses the nodes 402, 404, 410, 418, 420, 422, and 424, and the row 516 represents 'Path 8' that traverses the nodes 402, 404, 410, 418, 422, and 424.

The data structure 500 also includes four columns 518-524. The first three columns 518-522 represent the conditions that must be satisfied for the rule engine 206 to take the corresponding path. For example, the column 518 represents the condition (in the node 404) of what transaction type (e.g., a login transaction type, a payment transaction type, a funding source addition transaction type) is associated with the transaction request, the column 520 represents the condition (in the node 418) of whether the transaction request is initiated from a mobile device, and the column 522 represents the condition (in the node 412) of whether an amount involved in a payment transaction request is more than $500. In this example, in order for the rule engine to take 'Path 1,' the transaction request must be a login request and the request must be initiated from a mobile device.

The last column 524 represents the types of data required under each path. By traversing the potential paths in the abstract syntax tree 400, the rule set analyzer 204 may collect information related to the data types required to assess the conditions along each path, and store the information in the data structure 500.

Referring back to FIG. 3, the process 300 then eliminates (at step 310) a subset of the potential paths based on information extracted from the transaction request. Continuing with the example described above, based on the information stored in the data structure 500, the rule set analyzer 204 may eliminate one or more paths based on information that indicates one or more of (i) a transaction type of the transaction request, (ii) whether the device that initiates the transaction request is a mobile device, or (iii) if the request is a payment transaction request, whether an amount involved in the payment transaction is larger than $500. As discussed above, some types of the information may be obtained quicker (or more easily) than other types of information. For example, by extracting information related to a transaction type from the transaction request (which can be easily extracted from the transaction request itself without retrieving addition information from other sources), one can immediately eliminate at least two of the eight paths. In some embodiments, the rule set analyzer 204 may obtain more information related to the transaction request (e.g., information retrieved from an internal source within the service provider server 130) in order to eliminate additional paths.

Thus, upon receiving a transaction request (e.g., from a user device via the web server 134), the rule set analyzer 204 may extract information directly from the transaction request. In this example, the rule set analyzer 204 may be able to extract the transaction type related to the transaction request from the transaction request itself without retrieving information from other sources. Based on the information extracted from the transaction request, the rules set analyzer 204 may eliminate one or more potential paths from the data structure 500. For example, when the transaction request is determined to be related to a login transaction, the rule set analyzer 204 may eliminate Path 3 through Path 8 (6 paths).

After eliminating one or more potential paths, the process 300 then determines a set of data types required by the rule engine for evaluating the transaction request under the remaining potential paths. For example, when the rule set analyzer 204 has eliminated Path 3 through Path 8, the rule set analyzer 204 may determine the set of data types required by the rule engine 206 to evaluate the transaction under Path 1 and Path 2. As discussed above, in addition to the condition information, the rule set analyzer 204 may also store the data types that are required to evaluate the transaction request under each path in the data structure 500. As shown in FIG. 5, the column 524 represents the types of data required under each path. As such, after eliminating Path 3 through Path 8, the rule set analyzer 204 may retrieve the data types required for Path 1 and Path 2—the data type set 1 and the data type set 2 from the data structure 500.

The process 300 then retrieves (at step 320) the data according to the determined data types required for the remaining potential paths (relevant data types) for evaluating the transaction request. Continuing with the example described above, the rule set analyzer 204 may retrieve data according to the data types specified in the data type set 1 and the data type set 2 for evaluating the transaction request through either Path 1 or Path 2 depending on whether the request was initiated from a mobile device (Path 1) or not (Path 2). The data corresponding to the data types that are determined to be relevant to evaluating the transaction request may include various types of data and may be obtained from a variety of sources. For example, some of the data may be extracted from the transaction request itself (e.g., a user account associated with the transaction request, payment amount, transaction type, IP address of the source device, etc.). The risk set analyzer 204 may then extract the data directly from the transaction request.

Some of the data may be obtained from the user device that initiates the transaction request (e.g., browser type, a geographical location of the user device that initiates the transaction request, whether the user device is a mobile device, etc.). To obtain the data from the user device, the rule set analyzer 204 may coordinate with the web server 134 to request such data from the user device (e.g., from the location component 118 or the UI application 112 of the user device 110). Some of the data may be obtained from other modules and/or databases within the service provider server (e.g., transaction history of the user, transaction attempt history of the user, a number of funding sources associated with a user account, locations of user when initiating past transactions, etc.). The risk set analyzer 204 may send requests to other modules/databases such as the accounts database 136 and/or the service application 138 for retrieving such information related to the transaction request. Furthermore, some of the data may be obtained from an external source, such as a credit bureau and/or from the merchant server 120 (e.g., transaction history of the user account with the merchant, user activity history with the merchant, a credit score of the user, etc.). The risk set analyzer 204 may obtain the data by transmitting a request to an external server (e.g., the merchant server 120) for the information related to the transaction request.

As discussed above, some of the data may take longer time to retrieve than others. For example, information that needs to be retrieved over the network 160, such as information from the user device 110 and information from the merchant server 120 or other external sources may take longer time to retrieve than information that the risk set analyzer 204 may extract directly from the transaction request or obtained from an internal source such as the accounts database 136. By eliminating one or more potential paths from the rule engine, it has been contemplated that less information is required to be obtained before evaluating the transaction request by the rule engine 206, thereby reducing pre-processing time and resources. Thus, after retrieving only the data that is determined to be relevant to the transaction request, the transaction request along with the retrieved data is sent to the rule engine for evaluating the transaction request. Since all the data that is required under the paths that the rule engine 206 may traverse based on the transaction data is already available, the processing time by the rule engine 206 for evaluating the transaction request is reduced. The rule engine 206 may generate an outcome based on evaluating the transaction request, and sends the outcome to the web server 134 and/or the service application 138 such that the web server 134 and/or the service application 138 may process (e.g., approve or deny) the transaction request accordingly.

In some embodiments, the rule set analyzer 204 may store the data structure 500 as metadata 208 of the rule engine 206 such that the rule set analyzer 204 may use it for subsequent transaction requests. The rule set analyzer 204 may re-generate (or update) the data structure 500 periodically or when it is detected that the rules/conditions in the rule engine may have changed (e.g., when the rule engine is modified).

FIG. 6 is a block diagram of a computer system 600 suitable for implementing one or more embodiments of the present disclosure, including the service provider, server 130, the merchant server 120, and the user device 110. In various implementations, the user device 110 may include a mobile cellular phone, personal computer (PC), laptop, wearable computing device, etc. adapted for wireless communication, and each of the service provider server 130 and the merchant server 120 may include a network computing device, such as a server. Thus, it should be appreciated that the devices 110, 120, and 130 may be implemented as the computer system 600 in a manner as follows.

The computer system 600 includes a bus 612 or other communication mechanism for communicating information data, signals, and information between various components of the computer system 600. The components include an input/output (I/O) component 604 that processes a user (i.e., sender, recipient, service provider) action, such as selecting keys from a keypad/keyboard, selecting one or more buttons or links, etc., and sends a corresponding signal to the bus 612. The I/O component 604 may also include an output component, such as a display 602 and a cursor control 608 (such as a keyboard, keypad, mouse, etc.). The display 602 may be configured to present a login page for logging into a user account or a checkout page for purchasing an item from a merchant. An optional audio input/output component 606 may also be included to allow a user to use voice for inputting information by converting audio signals. The audio I/O component 606 may allow the user to hear audio. A transceiver or network interface 620 transmits and receives signals between the computer system 600 and other devices, such as another user device, a merchant server, or a service provider server via network 622. In one embodiment, the transmission is wireless, although other transmission mediums and methods may also be suitable. A processor 614, which can be a micro-controller, digital signal processor (DSP), or other processing component, processes these various signals, such as for display on the computer system 600 or transmission to other devices via a communication link 624. The processor 614 may also control transmission of information, such as cookies or IP addresses, to other devices.

The components of the computer system 600 also include a system memory component 610 (e.g., RAM), a static storage component 616 (e.g., ROM), and/or a disk drive 618 (e.g., a solid state drive, a hard drive). The computer system 600 performs specific operations by the processor 614 and other components by executing one or more sequences of instructions contained in the system memory component 610. For example, the processor 614 can perform the risk analysis model generation functionalities described herein according to the process 300.

Logic may be encoded in a computer readable medium, which may refer to any medium that participates in providing instructions to the processor 614 for execution. Such a medium may take many forms, including but not limited to, non-volatile media, volatile media, and transmission media. In various implementations, non-volatile media includes optical or magnetic disks, volatile media includes dynamic memory, such as the system memory component 610, and transmission media includes coaxial cables, copper wire, and fiber optics, including wires that comprise the bus 612. In one embodiment, the logic is encoded in non-transitory computer readable medium. In one example, transmission media may take the form of acoustic or light waves, such as those generated during radio wave, optical, and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer is adapted to read.

In various embodiments of the present disclosure, execution of instruction sequences to practice the present disclosure may be performed by the computer system 600. In various other embodiments of the present disclosure, a plurality of computer systems 600 coupled by the communication link 624 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The various features and steps described herein may be implemented as systems comprising one or more memories storing various information described herein and one or more processors coupled to the one or more memories and a network, wherein the one or more processors are operable to perform steps as described herein, as non-transitory machine-readable medium comprising a plurality of machine-readable instructions which, when executed by one or more processors, are adapted to cause the one or more processors to perform a method comprising steps described herein, and methods performed by one or more devices, such as a hardware processor, user device, server, and other devices described herein.

What is claimed is:

1. A method for detecting potentially fraudulent transactions by evaluating transaction requests using a rule engine, the method comprising:

accessing, by one or more hardware processors associated with a service provider server, a computer-based transaction processing engine configured to process transaction requests of a predetermined set of categories using the rule engine, wherein the rule engine comprises a plurality of rules and a plurality of conditions for evaluating the transaction requests;

analyzing, by the one or more hardware processors, the plurality of rules and the plurality of conditions of the rule engine;

determining, by the one or more hardware processors and based on the analyzing of the plurality of rules and the plurality of conditions, a plurality of potential processing paths for evaluating the transaction requests according to the rule engine;

determining, by the one or more hardware processors, a set of different data types related to the plurality of rules of the rule engine to process the transaction requests of the predetermined set of categories;

obtaining, by the one or more hardware processors, transaction processing data related to a previous processing of a plurality of transaction requests associated with the predetermined set of categories by the computer-based transaction processing engine, wherein the transaction processing data comprises information indicating characteristics of each data type in the set of different data types when obtained during the previous processing of the plurality of transaction requests by the computer-based transaction processing engine;

storing, by the one or more hardware processors in a data structure, the plurality of potential processing paths, corresponding data types from the set of different data types associated with each of the plurality of potential processing paths, and the information indicating the characteristics of each data type in the set of different data types;

receiving, by the one or more hardware processors, a transaction request initiated by a user through a merchant computing device;

extracting, by the one or more hardware processors from the transaction request, a category type associated with the transaction request;

eliminating, by the one or more hardware processors based on the extracted category type and the data structure, a subset of the plurality of potential processing paths, wherein the transaction request indicates that at least one rule in the rule engine from each processing path in the subset of the plurality of potential processing paths is not satisfied;

determining, by the one or more hardware processors from the set of different data types and based on the data structure, a first subset of data types required to process the transaction request according to the remaining potential processing paths from the plurality of potential processing paths;

retrieving, by the one or more hardware processors from a data source other than the transaction request, data related to the first subset of data types, but not a second subset of data types from the set of different data types based on the eliminated subset of potential processing paths, to evaluate the transaction request;

processing, by the one or more hardware processors, the transaction request based on the retrieved data; and notifying the merchant computing device of an outcome of processing the transaction request.

2. The method of claim 1, wherein the determining the plurality of potential processing paths comprises:

obtaining an abstract syntax tree from the rule engine; and traversing the abstract syntax tree to determine the plurality of potential processing paths according to the rule engine.

3. The method of claim 1, wherein the information indicating the characteristics of each data type comprises an average time to retrieve data corresponding to the data type.

4. The method of claim 1, wherein the subset of potential processing paths is eliminated prior to evaluating the transaction request by the computer-based transaction processing engine.

5. The method of claim 1, wherein the eliminating the subset of potential processing paths comprises extracting an initial set of data from the transaction request.

6. The method of claim 5, wherein the eliminating the subset of potential processing paths further comprises:

determining, for a first potential processing path in the plurality of potential processing paths, whether the first potential processing path is a possible processing path for the transaction request based on the initial set of data; and in response to a determination that the first potential processing path is not a possible processing path for the transaction request, including the first potential processing path in the subset of potential processing paths.

7. The method of claim 6, wherein the determining whether the first potential processing path is a possible processing path for the transaction request comprises determining whether at least one rule in the first potential processing path is not satisfied based on the initial set of data.

8. The method of claim 5, wherein the initial set of data comprises a transaction type associated with the transaction request.

9. The method of claim 8, wherein the transaction type is one of: a login request, a dispute request, a payment request, or a request for adding a funding source.

10. The method of claim 1, wherein the set of different data types comprises at least one of an Internet Protocol (IP) address of a source of the transaction request, a number of successful transactions within a predetermined period of time, a number of failed transactions within the predetermined period of time, a time, a browser type, a device type, an amount associated with the transaction, or a transaction type of the transaction.

11. The method of claim 1, further comprising:
determining that a transaction associated with the transaction request is successfully completed; and
transmitting a transaction successful alert to the merchant computing device.

12. A system associated with a service provider for detecting potentially fraudulent transactions by evaluating transaction requests using a rule engine, the system comprising:
a non-transitory memory; and
one or more hardware processors coupled to the non-transitory memory and configured to read instructions from the non-transitory memory to cause the system to perform operations comprising:
accessing a computer-based transaction processing engine configured to process transaction requests of a predetermined set of categories using the rule engine, wherein the rule engine comprises a plurality of rules and a plurality of conditions for evaluating the transaction requests;
analyzing the plurality of rules and the plurality of conditions of the rule engine;
determining, based on the analyzing the plurality of rules and the plurality of conditions, a plurality of potential processing paths for evaluating the transaction requests according to the rule engine;
determining a set of different data types related to the plurality of rules in the rule engine to process the transaction requests of the predetermined set of categories;
obtaining transaction processing data related to a previous processing of a plurality of transaction requests associated with the predetermined set of categories by the computer-based transaction processing engine, wherein the transaction processing data comprises information indicating characteristics of each data type in the set of different data types when obtained during the previous processing of the plurality of transaction requests by the computer-based transaction processing engine;
storing, in a data structure, the plurality of potential processing paths, corresponding data types from the set of different data types associated with each of the plurality of potential processing paths, and the information indicating the characteristics of each data type in the set of different data types;
receiving a transaction request initiated by a user through a merchant computing device;
extracting, by the one or more hardware processors from the transaction request, the category type associated with the transaction request;
eliminating a subset of the plurality of potential processing paths based on the extracted category type and the data structure, wherein the transaction request indicates that at least one rule in the rule engine from each potential processing path in the subset of the plurality of potential processing paths is not satisfied;
determining, from the set of different data types and based on the data structure, a first subset of data types required to process the transaction request according to the remaining potential processing paths from the plurality of potential processing paths;
retrieving, from a data source other than the transaction request, data related to the first subset of data types, but not a second subset of data types from the set of different data types based on the eliminated subset of potential processing paths, to evaluate the transaction request;
processing the transaction request based on the retrieved data; and
notifying the merchant computing device of an outcome of processing the transaction request.

13. The system of claim 12, wherein the determining the plurality of potential processing paths comprises:
obtaining an abstract syntax tree from the computer-based rule engine; and
traversing the abstract syntax tree to determine the plurality of potential processing paths according to the computer-based rule engine.

14. The system of claim 13, wherein the information indicating the characteristics of each data type comprises an average time to retrieve data corresponding to the data type.

15. The system of claim 12, wherein the subset of potential processing paths is eliminated prior to evaluating the transaction request by the rule engine.

16. The system of claim 12, wherein the eliminating the subset of potential processing paths comprises:
extracting an initial set of data from the transaction request;
determining, for a first potential processing path in the plurality of potential processing paths, whether the first potential processing path is a possible processing path for the transaction request based on the initial set of data; and
in response to a determination that the first potential processing path is not a possible processing path for the transaction request, including the first potential processing path in the subset of potential processing paths.

17. The system of claim 16, wherein the determining whether the first potential processing path is a possible processing path for the transaction request comprises determining whether at least one rule in the first potential processing path is not satisfied based on the initial set of data.

18. The system of claim 12, wherein the initial set of data comprises a transaction type associated with the transaction request.

19. A non-transitory machine readable medium having stored thereon machine-readable instructions executable to cause a service provider server to perform operations comprising:
accessing a computer-based transaction processing engine configured to process transaction requests of a predetermined set of categories using a rule engine, wherein the rule engine comprises a plurality of rules and a plurality of conditions for evaluating the transaction requests;

analyzing the plurality of rules and the plurality of conditions of the rule engine;

determining a plurality of potential processing paths for evaluating the transaction requests according to the rule engine based on the analyzing the plurality of rules and the plurality of conditions;

determining a set of different data types related to the plurality of rules in the rule engine to process the transaction requests of the predetermined set of categories;

obtaining transaction processing data related to previous processing of a plurality of transaction requests associated with the predetermined set of categories by the computer-based transaction processing engine, wherein the transaction processing data comprises information indicating characteristics of each data type in the set of different data types when obtained during the previous processing of the plurality of transaction requests by the computer-based transaction processing engine;

storing, in a data structure, the plurality of potential processing paths, corresponding data types from the set of different data types associated with each of the plurality of potential processing paths, and the information indicating the characteristics of each data type in the set of different data types;

receiving a transaction request initiated by a user through a merchant computing device;

extracting, from the transaction request, the category type associated with the transaction request;

eliminating a subset of the plurality of potential processing paths based on the extracted category type and the data structure, wherein the transaction request indicates that at least one rule in the rule engine from each potential processing path in the subset of the plurality of potential processing paths is not satisfied;

determining, from the set of different data types and based on the data structure, a first subset of data types required to process the transaction request according to the remaining potential processing paths from the plurality of potential processing paths;

retrieving, from a data source other than the transaction request, data related to the first subset of data types, but not a second subset of data types from the set of different data types based on the eliminated subset of potential processing paths, to evaluate the transaction request;

processing the transaction request based on the retrieved data; and notifying the merchant computing device of an outcome of processing the transaction request.

20. The non-transitory machine readable medium of claim 19, wherein the determining the plurality of potential processing paths comprises:

generating an abstract syntax tree by parsing the rules of the computer-based rule engine; and traversing the abstract syntax tree to determine the plurality of potential processing paths according to the rule engine.

* * * * *